US010072846B2

(12) United States Patent
Monahan et al.

(10) Patent No.: US 10,072,846 B2
(45) Date of Patent: Sep. 11, 2018

(54) TRAPPED VORTEX CAVITY STAGING IN A COMBUSTOR

(71) Applicant: General Electric Company, Schenectady, NY (US)

(72) Inventors: Sarah Marie Monahan, Latham, NY (US); Narendra Digamber Joshi, Schenectady, NY (US); Venkat Eswarlu Tangirala, Niskayuna, NY (US); Matthieu Marc Masquelet, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 406 days.

(21) Appl. No.: 14/791,684

(22) Filed: Jul. 6, 2015

(65) Prior Publication Data

US 2017/0009993 A1    Jan. 12, 2017

(51) Int. Cl.
F23R 3/28    (2006.01)
F23R 3/34    (2006.01)
F23C 5/08    (2006.01)
F23R 3/58    (2006.01)
F23R 3/12    (2006.01)
(Continued)

(52) U.S. Cl.
CPC .............. *F23R 3/286* (2013.01); *F23C 5/00* (2013.01); *F23C 5/08* (2013.01); *F23C 5/10* (2013.01); *F23C 5/24* (2013.01); *F23C 5/32* (2013.01); *F23R 3/02* (2013.01); *F23R 3/04* (2013.01); *F23R 3/045* (2013.01); *F23R 3/06* (2013.01); *F23R 3/10* (2013.01); *F23R 3/12* (2013.01);
(Continued)

(58) Field of Classification Search
CPC .... F23R 3/02; F23R 3/04; F23R 3/045; F23R 3/06; F23R 3/10; F23R 3/12; F23R 3/286; F23R 3/34; F23R 3/346; F23R 3/42–3/46; F23R 3/50–3/54; F23R 3/58; F23R 2900/00015; F23R 2900/03041; F23R 2900/03042; F23C 5/00; F23C 5/08; F23C 5/10; F23C 5/24; F23C 5/32
See application file for complete search history.

(56) References Cited

U.S. PATENT DOCUMENTS 4,928,479 A  *  5/1990  Shekleton ................ F23R 3/04
                                                     60/746
4,944,149 A      7/1990  Kuwata
(Continued)

*Primary Examiner* — Gerald L Sung
*Assistant Examiner* — Scott Walthour
(74) *Attorney, Agent, or Firm* — GE Global Patent Operation; Nitin Joshi

(57) ABSTRACT

A gas turbine engine and combustor assembly including a combustor liner defining therein a combustion chamber for the downstream flow of a main fluid. At least two axially spaced apart annular trapped vortex cavities are located on the combustor liner and staged axially and radially spaced apart. A cavity opening is located at a radially inner end of each of the at least two annular trapped vortex cavities. A plurality of injectors are configured tangentially relative to circular radially outer wall extending between an aft wall and a forward wall of each cavity to provide for an injection of air and fuel to form an annular rotating trapped vortex of a fuel and air mixture within a respective annular trapped vortex cavity. The annular rotating trapped vortex of the fuel and air mixture at the cavity openings is substantially perpendicular to the downstream flow of the main fluid.

11 Claims, 4 Drawing Sheets

(51) Int. Cl.
  *F23R 3/04* (2006.01)
  *F23C 5/00* (2006.01)
  *F23R 3/42* (2006.01)
  *F23C 5/32* (2006.01)
  *F23R 3/02* (2006.01)
  *F23R 3/10* (2006.01)
  *F23C 5/24* (2006.01)
  *F23R 3/06* (2006.01)

(52) U.S. Cl.
  CPC ............... *F23R 3/34* (2013.01); *F23R 3/346* (2013.01); *F23R 3/42* (2013.01); *F23R 3/58* (2013.01); *F05D 2240/35* (2013.01); *F23R 2900/00015* (2013.01); *F23R 2900/03041* (2013.01); *F23R 2900/03042* (2013.01); *Y02T 50/675* (2013.01)

(56) References Cited

U.S. PATENT DOCUMENTS

| | | | |
|---|---|---|---|
| 5,025,622 A * | 6/1991 | Melconian | F23R 3/425 60/39.464 |
| 6,951,108 B2 | 10/2005 | Burrus et al. | |
| 8,011,188 B2 | 9/2011 | Woltmann et al. | |
| 8,689,562 B2 | 4/2014 | Kendrick | |
| 2004/0103663 A1* | 6/2004 | Haynes | F23R 3/283 60/737 |
| 2006/0107667 A1* | 5/2006 | Haynes | F23R 3/286 60/776 |
| 2010/0115953 A1* | 5/2010 | Davis, Jr. | F01D 9/023 60/737 |
| 2012/0131925 A1* | 5/2012 | Mittricker | F23C 9/00 60/772 |

* cited by examiner

TRAPPED VORTEX CAVITY STAGING IN A COMBUSTOR

BACKGROUND

The present invention relates to combustors and, more particularly, to cavity staging in a combustor.

A conventional gas turbine engine typically includes a compressor for compressing air that is mixed with fuel and ignited in a combustor for generating a high pressure, high temperature gas stream, referred to as a post combustion gas. The post combustion gases flow to a turbine, where they are expanded, converting thermal energy from the post combustion gases to mechanical energy for driving a shaft to power the compressor and produce output power for powering an electrical generator, for example.

Electrical power generating gas turbine engines are typically operated for extended periods of time and exhaust emissions from the combustion gases are a concern and are subject to mandated limits. Thus, combustors are preferably designed for low exhaust emissions operation and, in particular, for low NOx operation. Typical designs for the combustor may include can, cannular or annular configurations.

In an exemplary embodiment, a typical low NOx can combustor includes a plurality of combustor cans circumferentially adjoining each other around the circumference of the engine. Can-annular combustors typically consist of a cylindrical can-type liner inserted into a transition piece. Annular combustors are also used in many gas turbine applications and include multiple pre-mixers positioned in rings directly upstream of the turbine nozzles in an annular fashion. An annular burner has an annular cross-section combustion chamber bounded radially by inner and outer liners while a can burner has a circular cross-section combustion chamber bounded radially by a single liner.

Irrespective of the combustor configuration, a typical low NOx combustor includes a premixer, including a swirler, having a plurality of circumferentially spaced apart vanes disposed at a duct inlet for swirling compressed air received from the engine compressor. In a can combustor configuration, each combustor can has a plurality of pre-mixers joined to the upstream end. In a can-annular combustor configuration, multiple fuel-air pre-mixers are positioned at the head end of the cylindrical can-type liner. Disposed downstream of the swirler(s) are suitable fuel injectors typically in the form of a row of circumferentially spaced-apart fuel spokes, each having a plurality of radially spaced apart fuel injection orifices which conventionally receive fuel, such as gaseous methane, through the centerbody for discharge into the pre-mixer duct upstream of a combustor dome.

Typically fuel injectors are disposed axially upstream from the combustion chamber so that the fuel and air have sufficient time to mix, typically by way of a pre-mixer, and pre-vaporize. In this way, the pre-mixed and pre-vaporized fuel and air mixture support cleaner combustion thereof in the combustion chamber for reducing exhaust emissions.

In an attempt to minimize the overall weight of engine systems, another type of combustor, referred to herein as an ultra-compact combustor (UCC), comprises a combustor having integrated as a part thereof, turning vanes of the turbine. The integration of the turning vanes and the combustor provides for the length of the combustor, and thus the overall system, to be reduced. The combustor typically includes one or more circumferential cavities in which fuel and air are injected and combustion happens in a trapped vortex. Combustion products pass from the cavity into the main bulk flow and occur in a rich-quench-lean manner.

Benefits of the use of ultra-compact combustors include reduced combustor size, weight reduction, and fewer parts. Challenges encountered during the use of ultra-compact combustors include managing pressure losses and achieving as complete combustion as possible in as small residence time as possible, and in turn minimize NOx and CO emissions.

Accordingly, there exists a need in the art to provide for a combustor that improves fuel-air mixing and that gradually introduces combustion products into the main flow, thereby providing for complete combustion and reduced NOx and CO emissions.

BRIEF DESCRIPTION

These and other shortcomings of the prior art are addressed by the present disclosure, which includes a method for operating a gas turbine engine.

One aspect of the present disclosure resides in a combustor assembly. The combustor assembly including a combustor, at least two annular trapped vortex cavities, a plurality of fuel injectors and a plurality of air injectors. The combustor is disposed axially about a central axis and includes a combustor liner having defined therein a combustion chamber for the downstream flow of a main fluid. The at least two annular trapped vortex cavities are located on the combustor liner and staged axially spaced apart. Each of the at least two annular trapped vortex cavities are defined between an annular aft wall, an annular forward wall, and a circular radially outer wall formed therebetween. A cavity opening is present at a radially inner end of each of the at least two annular trapped vortex cavities spaced apart from the radially outer wall and extending between the aft wall and the forward wall. The plurality of fuel injectors and the plurality of air injectors are disposed in the radially outer wall of one or more of the at least two annular trapped vortex cavities. The plurality of fuel injectors and the plurality of air injectors are configured tangentially relative to the circular radially outer wall to provide for an injection of air and fuel to form an annular rotating trapped vortex of a fuel and air mixture within a respective annular trapped vortex cavity. The annular rotating trapped vortex of the fuel and air mixture at the cavity openings of the at least two annular trapped vortex cavities is substantially perpendicular to the downstream flow of the main fluid.

Another aspect of the present disclosure resides in a gas turbine engine combustor assembly. The gas turbine engine combustor assembly including a combustor downstream of a compressor, an annular trapped vortex cavity, at least one additional trapped vortex cavity, a plurality of fuel injectors and a plurality of air injectors. The combustor is disposed axially about a central axis and includes a combustor liner having defined therein a combustion chamber for the downstream flow of a main fluid. The annular trapped vortex cavity is located at an upstream end of the combustor liner and defined between an annular aft wall, an annular forward wall, and a circular radially outer wall formed therebetween. The annular trapped vortex cavity includes a cavity opening at a radially inner end of the cavity spaced apart from the radially outer wall and extending between the aft wall and the forward wall. The at least one additional trapped vortex cavity is located on the combustor liner and spaced axially downstream from the upstream annular trapped vortex cavity. The at least one additional trapped vortex cavity is defined between an annular aft wall, an annular forward wall, and a circular radially outer wall formed therebetween. The at least one additional annular trapped vortex cavity includes a cavity opening at a radially inner end of the cavity spaced apart from the radially outer wall and extending between the aft wall and the forward wall. The plurality of fuel injectors and a plurality of air injectors are disposed in the radially outer wall of one or more of the annular trapped vortex cavities. The plurality of fuel injectors and the plurality of air injectors are configured tangentially relative to the circular radially outer wall to provide for an injection of air and fuel to form an annular rotating trapped vortex of a fuel and air mixture within a respective annular trapped vortex cavity. The annular rotating trapped vortex of the fuel and air mixture at the cavity openings of the annular trapped vortex cavities is substantially perpendicular to the downstream flow of the main fluid.

Yet another aspect of the disclosure resides in a gas turbine engine. The gas turbine engine includes a compressor section, a combustor section and a turbine section, configured in a downstream axial flow relationship about a central axis. The combustor section comprises a combustor assembly. The combustor assembly includes a combustor, at least two annular trapped vortex cavities, a plurality of fuel injectors and a plurality of air injectors. The combustor includes a combustor liner having defined therein a combustion chamber for the downstream flow of a main fluid. The at least two annular trapped vortex cavities are located on the combustor liner and staged axially spaced apart. Each of the at least two annular trapped vortex cavities are defined between an annular aft wall, an annular forward wall, and a circular radially outer wall formed therebetween. A cavity opening is located at a radially inner end of each of the at least two annular trapped vortex cavities spaced apart from the radially outer wall and extending between the aft wall and the forward wall. The plurality of fuel injectors and the plurality of air injectors are disposed in the radially outer wall of one or more of the at least two annular trapped vortex cavities. The plurality of fuel and air injectors are configured tangentially relative to the circular radially outer wall to provide for an injection of air and fuel to form an annular rotating trapped vortex of a fuel and air mixture within a respective annular trapped vortex cavity. The annular rotating trapped vortex of the fuel and air mixture at the cavity opening of each of the at least two annular trapped vortex cavities is substantially perpendicular to the downstream flow of the main fluid.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the terms "first", "second", or the like are intended for the purpose of orienting the reader as to specific components parts.

Moreover, in this specification, the suffix "(s)" is usually intended to include both the singular and the plural of the term that it modifies, thereby including one or more of that term (e.g., "the opening" may include one or more openings, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

As discussed in detail below, embodiments of the present disclosure provide a combustor including axial staging, an engine including the axial staged combustor and a method for operating a gas turbine engine including an axial staged combustor. This disclosure may, however, be embodied in many different forms and should not be construed as limited to the embodiments set forth herein; rather these embodiments are provided so that this disclosure will be thorough and complete and will fully convey the scope of the disclosure to those skilled in the art.

Figure 1:
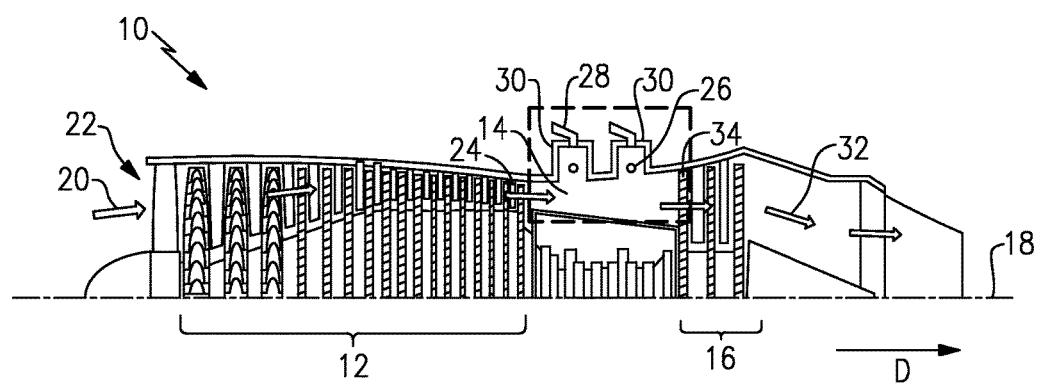
FIG. 1 is a schematic illustration of a portion of an industrial gas turbine engine including a combustor including axial staging, in accordance with one or more embodiments of the present disclosure.

Illustrated in FIG. 1 is an exemplary industrial gas turbine engine 10 including a multi-stage axial compressor 12 disposed in serial flow communication with a low NOx axial staged combustor 14 and a single or multi-stage turbine 16 about an axis 18. The turbine 16 is drivingly connected to the compressor 12 by a drive shaft which is also used to drive an electrical generator (not shown) for generating electrical power. During operation, the engine 10 receives an inlet flow 20 via an engine inlet 22. The compressor 12 discharges this inlet flow 20 as a main flow 24 comprising compressed air in a downstream direction D into the axial staged combustor 14, without the use of a pre-mixer. More particularly, a portion of the air from the compressor is discharged and feeds the main flow 24. Another portion of the air from the compressor would be directed to the vortex cavities (described presently). The portion of the compressed air 24 discharged to fed the main flow 24 is mixed in the axial staged combustor 14 with an annular rotating trapped vortex 26 of a fuel and air mixture (including remaining portion of compressed air) input via one or more injectors 28 directly into one or more axial staged vortex cavities 30, without the use of a pre-mixer. The annular rotating trapped vortex 26 of the fuel and air mixture is mixed with the compressed air flow 24 and ignited for generating a resultant flow of combustion gases 32 from which energy is extracted by the turbine 16 for rotating the shaft to power the compressor 12 and driving the generator or other suitable external load. In an embodiment, the axial staged combustor 14 is can-annular having a plurality of combustor can assemblies circumferentially disposed about an engine centerline 18. In an alternate embodiment, the axial staged combustor 14 is an annular combustor assembly circumferentially disposed about the engine centerline 18. In yet another alternate embodiment, the combustor is an ultra-compact combustor (UCC) wherein a portion of a plurality of turbine vanes 34 of the turbine 16 are integrated with the combustor 14 so as to provide reduced combustor size, weight reduction, and fewer parts.

Figure 2:
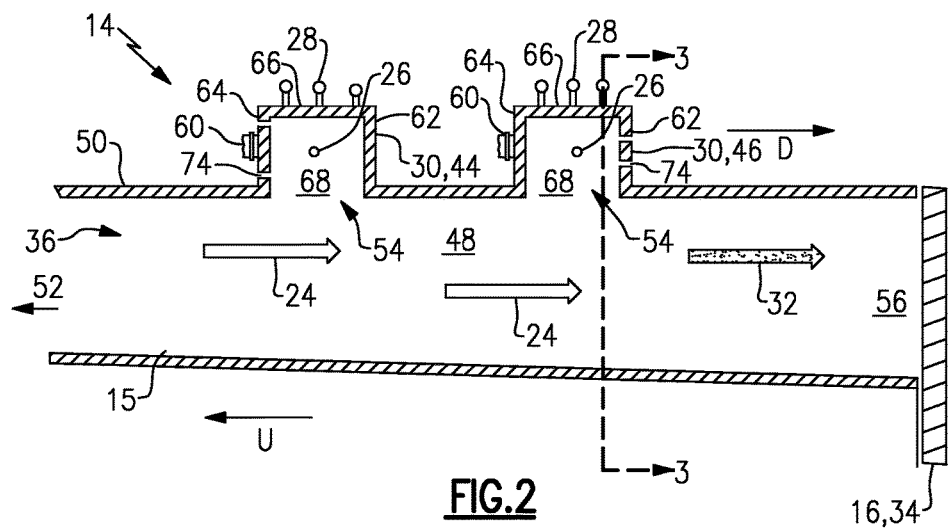
FIG. 2 is an enlarged longitudinal cross-sectional view illustrating of a portion of the gas turbine engine of FIG. 1, and in particular a combustor, including axial staging, in accordance with one or more embodiments of the present disclosure.
Figure 3:
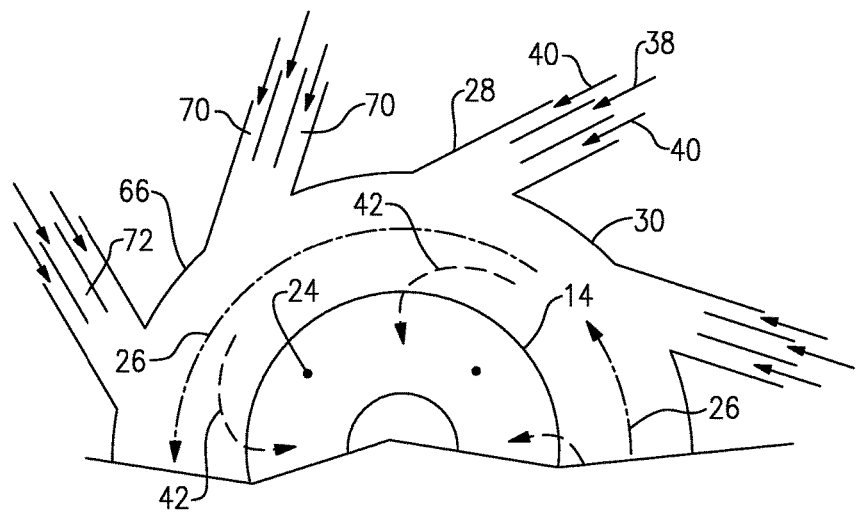
FIG. 3 is a cross-sectional view taken through line 3-3 of FIG. 2, illustrating a portion of the combustor of FIG. 2, in accordance with one or more embodiments of the present disclosure.

Referring now to FIGS. 2 and 3, illustrated is a portion of the engine 10 of FIG. 1, illustrated by dotted line in FIG. 1. More particularly, illustrated is a portion of the combustor 14 including at least two axial-staged vortex cavities 30 positioned spaced apart in an axial direction, where combustion takes place. In this particular embodiment, the combustor 14 is an axial inflow combustor 15. More specifically, as illustrated, flow through the main combustor 14 is primarily axial as shown, while flow into the cavities 30, via one or more injectors (described presently) is tangential, circumferential into the page.

During operation, swirling compressed air 24 enters the combustor 14 at a main combustor flow inlet 36. The plurality of fuel and air injectors 28 inject fuel 38 and air 40 directly into each of the vortex cavities 30 in a manner to provide for the annular rotating vortex 26 of the fuel and air mixture as indicated in FIG. 3. More specifically, the injectors 28 inject the air and fuel flow tangentially into each of the vortex cavities 30 without the aid of a pre-mixer. The circumferential direction in which the flow travels in each of the cavities 30 is substantially perpendicular to the main combustor flow 24. The injection of the fuel and air in this manner provides for a highly tangential, swirling flow providing enhanced mixing and flame speeds within the cavities 30. In an embodiment the trapped vortex combustors can operate as rich-burn, quick-quench combustors or lean burn combustors when all fuel is injected into the cavities 30. Subsequent to cavity combustion, a flow of combustion product 42 passes from each of the vortex cavities 30 into the main bulk flow 24. The flow of combustion product 42 from within each cavity 30 is input into the main flow 24 where they further mix. As best illustrated in FIG. 3, the flow of combustion product 42 is circulated into the main flow 24 in a substantially perpendicular relationship to the axial flow direction of the main flow 24. The rotational swirl of the annular rotating trapped vortex 26 of the fuel and air mixture within each of the vortex cavities 30 provides for gradual merging of the flow of combustion product 24 at a near 90° angle to the main flow 24 so as to enhance mixing of the two flows. The enhanced mixing results in improved combustion efficiency and lower emissions.

In an embodiment, and as best illustrated in FIG. 2, an upstream-most vortex cavity 44 would be the richest; subsequent cavities 46 would be leaner moving axially downstream "D". Ideally, all combustion is complete before the resultant flow of combustion gases 32 reaches the turning vanes 34 of the turbine 16. Axial staging, with the additional downstream vortex cavity 46, provides more time for the fuel-air mixture to burn while not adding to the axial length of the combustor 14.

In an embodiment the combustor 14 is disposed directly downstream of a pre-mixer (not shown) that forms a main air/fuel mixture in the main flow 24 in a pre-mixing zone between the pre-mixer and the combustor 14. The combustor 14 includes a combustion chamber 48 surrounded by a tubular or annular combustor liner 50 circumscribed about axis 18 and attached to a combustor dome (not shown). The generally flat combustor dome is located at an upstream end 52 of the combustion chamber 48 and an outlet is located at a downstream end 56 of the combustion chamber 48 to affect a discharge to the turbine 16.

The lean combustion process associated with the present disclosure makes achieving and sustaining combustion difficult and associated flow instabilities may affect the combustor's low NOx emissions effectiveness. In order to overcome this problem within combustion chamber 48, some technique for igniting the fuel/air mixture and stabilizing the flame thereof is required. This is accomplished by the incorporation of the at least two trapped vortex cavities 30 formed in the combustor liner 50. The trapped vortex cavities 30 are utilized to produce the annular rotating vortex 26 of the fuel and air mixture as schematically depicted in the cavities in FIGS. 2 and 3.

Referring more specifically to FIG. 2, an igniter 60 is used to ignite the annular rotating trapped vortex 26 of the fuel and air mixture and spread a flame front into the rest of the combustion chamber 48. Each of the trapped vortex cavities 30 thus may serve as a pilot to ignite the main air/fuel mixture in the air/fuel mixture flow 24. Each of the trapped vortex cavities 30 is illustrated as being substantially rectangular in shape and is defined between an annular aft wall 62, an annular forward wall 64, and a circular radially outer wall 66 formed therebetween which is substantially perpendicular to the aft and forward walls 62 and 64, respectively, and thereby defining an annular cavity shape. The term "aft" refers to the downstream direction D and the term "forward" refers to an upstream direction U.

Each vortex cavity 30 defines a cavity opening 68, extending between the aft wall 62 and the forward wall 64, is open to the combustion chamber 48 at a radially inner end 54 of the cavity 30. In the exemplary embodiment illustrated herein, each vortex cavity 30 is substantially rectangular in cross-section and the aft wall 62, the forward wall 64, and the outer wall 66 are approximately equal in length in an axially extending cross-section as illustrated in the FIG. 2.

Figure 4:
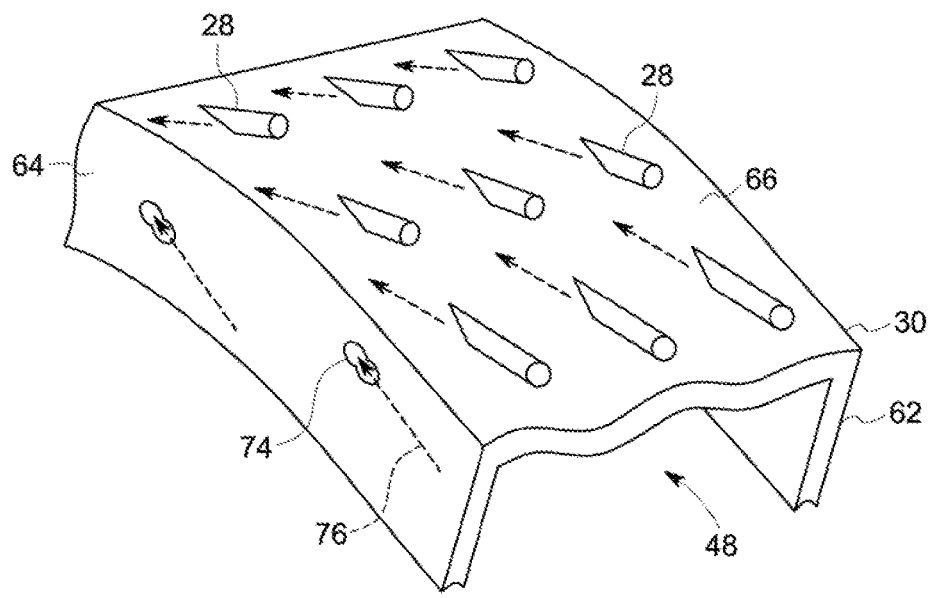
FIG. 4 is an enlarged isometric view of a portion of the vortex cavity of FIG. 2, in accordance with one or more embodiments of the present disclosure.
Figure 5:
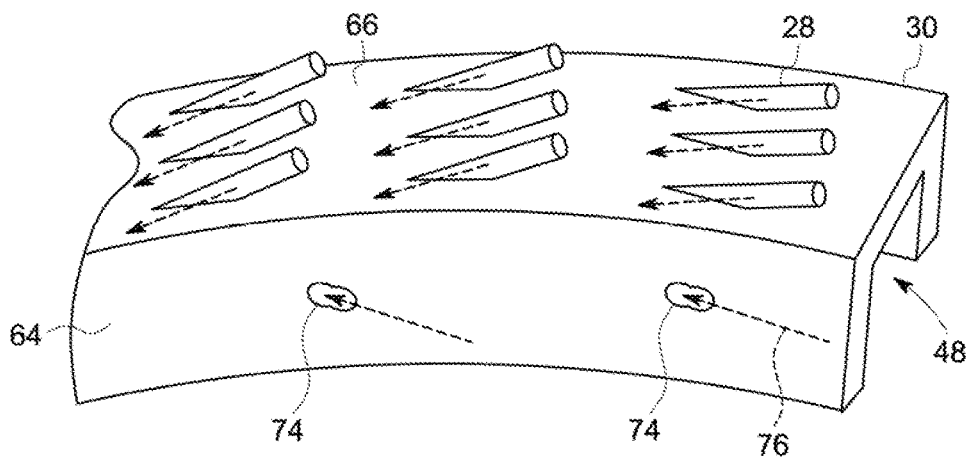
FIG. 5 is an enlarged isometric view of a portion of the vortex cavity of FIG. 2, in accordance with one or more embodiments of the present disclosure.

Referring to FIGS. 3-5, vortex driving injected air 40 is injected through air injection holes 70 of each of the injectors 28 about the annular outer wall 66 in a substantially tangential direction relative to the annular outer wall 66. Additionally, vortex fuel 38 is injected through fuel injection holes 72 of each of the injectors 28 about the annular outer wall 66 in a substantially tangential direction relative to the annular outer wall 66. To achieve such tangential injection of fuel 38 and air 40, each of the injectors 28 is configured tangentially about the outer annular surface 66, as best illustrated in FIGS. 4 and 5. In alternate embodiments, the injectors 28 may be disposed on the annular aft wall 62 and/or the annular forward wall 64. Furthermore, in an embodiment the injectors 28 may be disposed in a substantially tangential direction relative to the annular outer wall 66 on only a single cavity of the multiple vortex cavities 30, such as the upstream-most vortex cavity 44. In yet another embodiment, the fuel injection holes 72 and the air injection holes 70 may be formed separately. In an embodiment, there need not be a fuel injector with each air injector, and vice versa.

Referring more specifically to FIG. 3, the vortex fuel 38 and vortex air 40 enters the trapped vortex cavities 30 through the injectors 28. The injectors 28 are in flow communication with an outer fuel manifold (not shown) that receives the vortex fuel 38 by way of a fuel conduit (not shown). Likewise, injectors 28 are in flow communication with a source of air, as previously indicated.

In an embodiment, film cooling means, in the form of cooling apertures 74, such as cooling holes or slots angled through walls, may be included and are well known in the industry for cooling walls in the combustor. In an exemplary embodiment, film cooling apertures 74, illustrated in FIGS. 2, 4 and 5, are disposed through the aft wall 62, the forward wall 64, and the outer wall 66 may be used as the film cooling means. The film cooling apertures 74 are angled to help promote annular rotating vortex 26 of the fuel and air mixture formed within the cavities 30 and are also used to cool the walls. The film cooling apertures 74 are angled to flow cooling air 76 (as best illustrated in FIGS. 4 and 5) in the direction of rotation of the annular rotating trapped vortex 26 of the fuel and air mixture. Due to the entrance of air and fuel in the cavities 30 from the injectors 28 and the film cooling apertures 74, the annular rotating trapped vortex 26 of the fuel and air mixture at the cavity openings 68 of the vortex cavities 30 is substantially perpendicular to the downstream D flow of the main flow 24.

Figure 6:
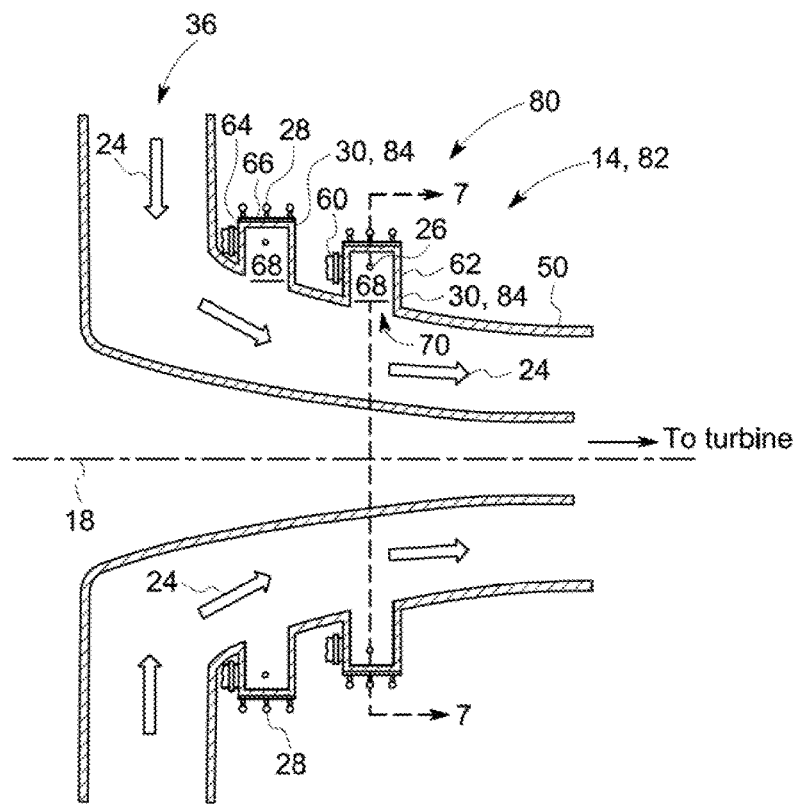
FIG. 6 is an enlarged longitudinal cross-sectional view of an alternative combustor, including stepped axial staging, in accordance with one or more embodiments of the present disclosure.
Figure 7:
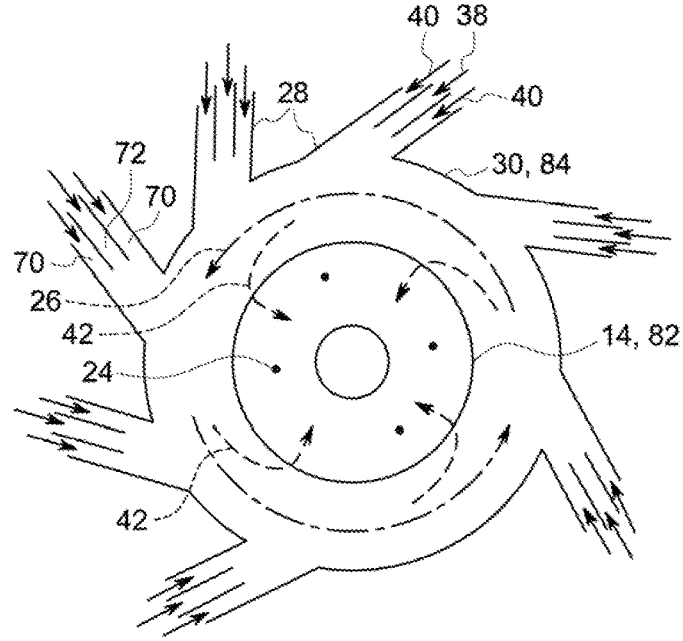
FIG. 7 is a cross-sectional view taken through line 7-7 of FIG. 6, illustrating a portion of the combustor of FIG. 6, in accordance with one or more embodiments of the present disclosure

Referring now to FIGS. 6 and 7, illustrated is an alternate embodiment of a portion of an engine 80 and more specifically a combustor 14, generally similar to engine 10 of FIG. 1 and combustor 14 of FIGS. 2 and 3. Features that are identical to those of FIGS. 1-5 need not be specifically described, and accordingly like numbers are used to indicate like elements. More particularly, illustrated is a portion of the combustor 14 disposed about an axis 18 and including at least two staged vortex cavities 30 positioned spaced apart in both an axial and radial direction, where combustion takes place. In this particular embodiment, the combustor 14 is a radial inflow combustor 82. During operation, a portion of the swirling compressed air 24 enters the radial inflow combustor 82 at a main combustor flow inlet 36. Another portion of the air from the compressor would be directed to the vortex cavities (described presently). A plurality of fuel and air injectors 28 inject fuel 38 and air 40 (remaining portion of compressed air 24) into each of the vortex cavities 30 in a manner to provide for the annular rotating trapped vortex 26 of the fuel and air mixture as indicated in FIG. 7. As previously indicated, in this particular embodiment, the vortex cavities 30 are configured as radially and axially staged vortex cavities 84, being staged both radially and axially from one another. Trapped vortex combustors including the radially and axially staged vortex cavities 84 can operate as rich-burn, quick-quench combustors or lean burn combustors when all fuel is injected into the cavities. Subsequent to combustion, a flow of combustion product 42 passes from each of the radially and axially staged vortex cavities 84 into the main bulk flow 24. The flow of combustion product 42 from within each radially and axially staged vortex cavity 84 is input into the main flow 24 where they further mix. As best illustrated in FIG. 7, the flow of combustion product 42 is circulated into the main flow 24 in a substantially perpendicular relationship to the axial flow direction of the main flow 24. The rotational swirl of the annular rotating trapped vortex 26 of the fuel and air mixture within each of the radially and axially staged vortex cavities 84 provides for gradual merging of the flow of combustion product 24 at a near 90° angle to the main flow 24 so as to enhance mixing of the two flows. The enhanced mixing results in improved combustion efficiency and lower emissions.

Similar to the previous embodiment, ideally, complete combustion is achieved before the resultant flow of combustion gases 32 reaches the turbine 16. Axial staging, with the additional downstream vortex cavity 84, provides more time for the fuel-air mixture to burn while not adding to the axial length of the combustor 14.

In an embodiment the combustor 14 is configured generally similar to the combustor of FIGS. 2-5. More specifically, the combustor 14 as previously indicated is configured as a radial inflow combustor 82 and includes a combustion chamber 48 surrounded by a tubular or annular combustor liner 50 circumscribed about axis 18 and attached to a combustor dome (not shown).

As previously indicated, to achieve and sustain complete combustion and associated flow instabilities that effect the combustors low NOx emissions effectiveness, the combustor 82 includes the at least two radially and axially staged trapped vortex cavities 84 formed in a combustor liner 50. As best illustrated in FIG. 6, the radial-axial staged vortex cavities 84 are in a generally stair-stepped configuration. The trapped vortex cavities 84 are utilized to produce the annular rotating trapped vortex 26 of the fuel and air mixture as schematically depicted in the cavities in FIGS. 6 and 7.

Referring more specifically to FIG. 6, an igniter 60 is used to ignite the annular rotating trapped vortex 26 of the fuel and air mixture and spread a flame front into the combustion chamber 48. Similar to the previous embodiment, each of the trapped vortex cavities 84 is illustrated as being substantially rectangular in shape and is defined between an annular aft wall 62, an annular forward wall 64, and a circular radially outer wall 66 formed therebetween, and thereby defining an annular cavity shape.

Each radially-axially staged vortex cavity 84 defines a cavity opening 68, extending between the aft wall 62 and the forward wall 64, and is open to the combustion chamber 48 at a radially inner end 54 of the cavity 84.

Referring to FIG. 7, vortex driving injected air 3) is injected through air injection holes 70 of each of the injectors 28 about the annular outer wall 66 or each cavity 84 in a substantially tangential direction relative to the annular outer wall 66. Additionally, vortex fuel 38 is injected through fuel injection holes 72 of one or more of the injectors 28 about the annular outer wall 66 in a substantially tangential direction relative to the annular outer wall 66. To achieve such tangential injection of fuel 38 and air 40, each of the injectors 28 is configured tangentially about the outer annular surface 66, as best illustrated in FIG. 7. Due to the entrance of air and fuel in the cavities 84 from the injectors 28, a tangential direction of annular rotating trapped vortex 26 of the fuel and air mixture at the cavity openings 68 of the vortex cavities 84 is substantially perpendicular to the downstream D flow of the main flow 24. The radial/axial staging of the vortex cavities as disclosed herein aid in maintaining the swirling momentum of the flow which is critical. This swirling momentum would allow a reduction or an elimination of a first stage turbine nozzle and the radial/axial staging will help maintain that momentum through tangential injection while the main flow is trying to expand axially.

Accordingly, the combustion gases generated by the trapped vortex within each cavity 30, either an axially staged vortex cavity or a radially-axially staged vortex cavity 84, as described herein, serves as a pilot for combustion of an air and fuel mixture main flow 24 received into the combustion chamber 48 from the pre-mixer. The trapped vortex cavities 30 provide a continuous ignition and flame stabilization source for the fuel/air mixture entering the combustion chamber 48. The staging of at least two trapped vortex cavities 30 wherein the annular rotating trapped vortex 26 of the fuel and air mixture is input into the main flow 24 in a substantially perpendicular direction to the main flow 24, provides increased mixing of the annular rotating trapped vortex 26 of the fuel and air mixture and the main flow 24, thus allowing complete combustion to take place within a shorter combustor, and less residence time, thereby providing reduced combustor size, weight reduction, and fewer parts.

Furthermore, a combustor including at least two trapped vortex combustors configured to input an annular rotating trapped vortex of a fuel and air mixture into the main flow at a substantially perpendicular direction, can achieve substantially complete combustion with substantially less residence time than a conventional lean pre-mixed industrial gas turbine combustor. By increasing mixing of the annular rotating trapped vortex of a fuel and air mixture and the main flow and keeping the residence time in the combustion chamber 48 relatively short, the time spent at temperatures above the thermal NOx formation threshold can be reduced, thus, reducing the amount of NOx produced. A risk to this approach is increased CO levels due to reduced time for complete CO burnout. The annular rotating trapped vortex 26 of the fuel and air mixture configured to be input with the main flow 24 at a substantially perpendicular direction provides high combustor efficiency under much shorter residence time than conventional aircraft combustors.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A combustor assembly comprising:
   a radial inflow combustor disposed axially about a central axis and including a combustor liner having defined therein a combustion chamber for a downstream flow of a main fluid;
   at least two annular trapped vortex cavities located on the combustor liner and staged axially and radially spaced apart, each of the at least two annular trapped vortex cavities defined between a respective annular aft wall, a respective annular forward wall, and a respective circular radially outer wall formed therebetween;
   a respective cavity opening at a radially inner end of each of the at least two annular trapped vortex cavities spaced apart from the respective circular radially outer wall and extending between the respective annular aft wall and the respective annular forward wall;
   a plurality of fuel injectors and a plurality of air injectors disposed in the respective circular radially outer wall of each of the at least two annular trapped vortex cavities, the respective pluralities of fuel injectors and the respective pluralities of air injectors configured tangentially relative to the respective circular radially outer walls to provide for injection of air and fuel to form an annular rotating trapped vortex of a fuel and air mixture within each annular trapped vortex cavity of the at least two annular trapped vortex cavities, and
   wherein each annular rotating trapped vortex of the fuel and air mixture at the respective cavity openings of each of the at least two annular trapped vortex cavities is substantially perpendicular to the downstream flow of the main fluid.

2. The combustor assembly as claimed in claim 1, wherein the radial inflow combustor is an ultra-compact combustor wherein at least one turbine vane of a plurality of turbine vanes of a turbine are integrated with the radial inflow combustor.

3. The combustor assembly as claimed in claim 1, further comprising one or more film cooling apertures disposed through at least one of the respective annular aft wall, the respective annular forward wall, and the respective circular radially outer wall of each of the at least two annular trapped vortex cavities.

4. The combustor assembly as claimed in claim 1, wherein the combustor assembly is coupled to a gas turbine engine, the combustor assembly being adapted for power generation.

5. A gas turbine engine combustor assembly comprising:
   a radial inflow combustor downstream of a compressor, the combustor disposed axially about a central axis and including a combustor liner having defined therein a combustion chamber for a downstream flow of a main fluid;

an annular trapped vortex cavity located at an upstream end of the combustor liner and defined between an annular aft wall, an annular forward wall, and a circular radially outer wall formed therebetween, the annular trapped vortex cavity including a cavity opening at a radially inner end of the annular trapped vortex cavity spaced apart from the circular radially outer wall and extending between the annular aft wall and the annular forward wall;

at least one additional trapped vortex cavity located on the combustor liner and spaced axially downstream from the annular trapped vortex cavity, the at least one additional trapped vortex cavity defined between an annular aft wall, an annular forward wall, and a circular radially outer wall formed therebetween, the at least one additional trapped vortex cavity including a cavity opening at a radially inner end of the cavity spaced apart from the circular radially outer wall and extending between the annular aft wall and the annular forward wall; and a respective plurality of fuel injectors and a respective plurality of air injectors disposed in the respective circular radially outer wall of each of the annular trapped vortex cavity and the at least one additional trapped vortex cavity, the respective pluralities of fuel injectors and the respective pluralities of air injectors configured tangentially relative to the respective circular radially outer walls to provide for injection of air and fuel to form a respective annular rotating trapped vortex of a fuel and air mixture within each of the annular trapped vortex cavity and the at least one additional trapped vortex cavity, wherein the annular trapped vortex cavity and the at least one additional trapped vortex cavity are staged radially spaced apart; and wherein each annular rotating trapped vortex of the fuel and air mixture at the respective cavity openings of the annular trapped vortex cavity and the at least one additional trapped vortex cavity is substantially perpendicular to the downstream flow of the main fluid.

6. The gas turbine engine combustor assembly as claimed in claim 5, wherein the radial inflow combustor is an ultra-compact combustor wherein at least one turbine vane of a plurality of turbine vanes of a turbine are integrated with the radial inflow combustor.

7. The gas turbine engine combustor assembly as claimed in claim 5, wherein the annular trapped vortex cavity is a first annular trapped vortex cavity and wherein the at least one additional trapped vortex cavity is a second annular trapped vortex cavity axially staged downstream of the first annular trapped vortex cavity.

8. The gas turbine engine combustor assembly as claimed in claim 5, further comprising one or more angled film cooling apertures disposed through at least one of the respective annular aft wall, the respective annular forward wall, and the respective circular radially outer wall of each of the annular trapped vortex cavity and the at least one additional trapped vortex cavity.

9. A gas turbine engine comprising:
a compressor section;
a combustor section;
a turbine section, wherein the compressor section, the combustor section and the turbine section are configured in a downstream axial flow relationship about a central axis, the combustor section comprising a combustor assembly comprising:
a radial inflow combustor including a combustor liner having defined therein a combustion chamber for a downstream flow of a main fluid;
at least two annular trapped vortex cavities located on the combustor liner and staged axially and radially spaced apart, each of the at least two annular trapped vortex cavities defined between a respective annular aft wall, a respective annular forward wall, and a respective circular radially outer wall formed therebetween;
a respective cavity opening at a radially inner end of each of the at least two annular trapped vortex cavities spaced apart from the respective circular radially outer wall and extending between the respective annular aft wall and the respective annular forward wall;
a plurality of fuel injectors and a plurality of air injectors disposed in the respective circular radially outer wall of each of the at least two annular trapped vortex cavities, the respective pluralities of fuel injectors and the respective pluralities of air injectors configured tangentially relative to the respective circular radially outer walls to provide for injection of air and fuel to form a respective annular rotating trapped vortex of a fuel and air mixture within each annular trapped vortex cavity of the at least two annular trapped vortex cavities, and
wherein each annular rotating trapped vortex of the fuel and air mixture at the respective cavity openings of each of the at least two annular trapped vortex cavities is substantially perpendicular to the downstream flow of the main fluid.

10. The gas turbine engine as claimed in claim 9, wherein the radial inflow combustor is an ultra-compact combustor wherein at least one turbine vane of a plurality of turbine vanes of a turbine are integrated with the radial inflow combustor.

11. The gas turbine engine as claimed in claim 9, further comprising one or more film cooling apertures disposed through at least one of the respective annular aft wall, the respective annular forward wall, and the respective circular radially outer wall of each of the at least two annular trapped vortex cavities.

* * * * *